United States Patent
Sanchez et al.

(10) Patent No.: US 7,285,205 B2
(45) Date of Patent: Oct. 23, 2007

(54) PROCESS OF REGENERATIVE REFORMING

(75) Inventors: Eric Sanchez, Rueil Malmaison (FR); Dominique Casanave, Villeurbanne (FR)

(73) Assignee: Institut Francias du Petrole, Rueil Malmaison Cedex (FR)

( * ) Notice: Subject to any disclaimer, the term of this patent is extended or adjusted under 35 U.S.C. 154(b) by 332 days.

(21) Appl. No.: 10/797,123

(22) Filed: Mar. 11, 2004

(65) Prior Publication Data
US 2004/0178119 A1  Sep. 16, 2004

(30) Foreign Application Priority Data
Mar. 11, 2003 (FR) .................................. 03 03072

(51) Int. Cl.
*C10G 59/02* (2006.01)
*C10G 35/04* (2006.01)
(52) U.S. Cl. .................. 208/64; 208/63; 208/134; 585/422; 585/441
(58) Field of Classification Search ................ 208/64, 208/63, 134; 585/412, 441, 422
See application file for complete search history.

(56) References Cited

U.S. PATENT DOCUMENTS

| | | | |
|---|---|---|---|
| 3,470,090 A | 9/1969 | Carson | |
| 4,133,743 A * | 1/1979 | Boret et al. | 208/64 |
| 4,167,473 A | 9/1979 | Sikonia | |
| 4,167,474 A | 9/1979 | Sikonia | |
| 4,401,554 A * | 8/1983 | Choi et al. | 208/64 |
| 5,203,988 A * | 4/1993 | Swan et al. | 208/65 |
| 5,234,575 A * | 8/1993 | Haag et al. | 208/70 |
| 5,354,451 A | 10/1994 | Goldstein et al. | |
| 5,368,720 A * | 11/1994 | Dolan et al. | 208/65 |
| 5,417,843 A | 5/1995 | Swart et al. | |

FOREIGN PATENT DOCUMENTS

| | | |
|---|---|---|
| FR | 2657087 | 7/1991 |
| WO | WO9312202 | 6/1993 |

* cited by examiner

*Primary Examiner*—Glenn Caldarola
*Assistant Examiner*—John Douglas
(74) *Attorney, Agent, or Firm*—Millen, White, Zelano & Branigan, P.C.

(57) ABSTRACT

In a regenerative reforming facility using a series of moving beds, a direct supply of regenerated catalyst, optionally reduced is passed into at least two of the reactors of the series. Spent catalysts from different reactors are passed into a common mixing apparatus so as to provide a homogeneous degree of coke on the spent catalysts which are thereafter passed to a regenerator. The feedstock and the intermediate effluents continue to circulate in succession relative to the reactors. The invention makes it possible in particular to reduce the operating pressure of the units to less than 0.2 MPa.

19 Claims, 3 Drawing Sheets

PROCESS OF REGENERATIVE REFORMING

TECHNOLOGICAL BACKGROUND

The invention relates to the moving-bed processes such as gasoline reforming (reforming according to English terminology) for the improvement of the octane number of petroleum fractions that are located in the range of gasolines, i.e., at the starting point between 70° C. and 110° C., and at the end boiling point between 150° C. and 180° C. More generally, the invention relates to any process that uses a series of moving-bed reactors such as are found in the aromatizing process or the process for dehydrogenating normal paraffins. The following description refers to the reforming process with continuous regeneration that will be designated by the name of regenerative reforming. The process for reforming gasolines started in the 1950s and has since known important technological developments that are often linked to the appearance of new generations of catalysts according to three successive stages. The appearance of catalyst was based on platinum on alumina in the 1950s. The units worked at pressures on the order of 5 MPa, and the catalyst was regenerated about every 6 months. Toward the end of the 1960s, the bimetallic catalysts that would allow the operating pressure to be lowered to around approximately 3 MPa appeared. Finally, at the beginning of the 1970s, the appearance of the continuous regeneration of catalyst made it possible to reach operating pressures only on the order of 1 MPa.

Currently, the regenerative reforming units operate at pressures of several bar (1 bar=0.1 MPa), typically 3 bar (0.3 MPa), on very selective catalysts that produce maximum hydrogen and on feedstocks that have a tendency of becoming more narrow.

The general tendency that emerges from this development is the continuous reduction of the pressure whose impact on the reformate yields is very significant.

The chemical reactions that are involved in the reforming process are numerous. The main one among them is the dehydrogenation of naphthenes into aromatic compounds, which is the most desired chemical family, since it is the one that promotes high octane numbers. The dehydrocyclization of paraffins into aromatic compounds and the isomerization of paraffins and particularly paraffins with a carbon atom number of 5 or 6 are also desired, since they also accompany an increase in the octane number. Among the unfavorable reactions, i.e., that do not lead to an improvement of the octane number, it is possible to cite the hydrocracking of paraffins and naphthenes.

The thermodynamic data show that the equilibrium of various chemical families is shifted toward the low-pressure aromatic compounds, which explains the technological development of units toward increasingly weaker operating pressures, while maintaining a certain partial hydrogen pressure that makes it possible to limit the deactivation of the catalyst by the coke. Actually, the coke is a compound of high molecular weight, characterized by a low H/C ratio, generally between 0.3 and 1.0, which is deposited on the active sites of the catalyst. Although the transformation selectivity of the hydrocarbons into coke is very low, the contents of coke accumulated on the catalyst can be very significant. Typically, for the units in a moving bed, these contents are between 3 and 10% by weight at the outlet of the last reactor.

The current technology of the catalytic reforming units is that of the moving bed that appeared in the 1970s in two main forms: the one that is described in U.S. Pat. No. 4,119,526 that is characterized by a vertical stacking of reactors through which the feedstock passes in succession, and that of the applicant that is characterized by reactors that are placed side by side.

In the two cases, the effluents that are obtained from a reactor are heated in a furnace before being introduced at the top of the next reactor since, overall, the reactions that are involved are endothermic and the reactors are operated at the same starting temperature. In the technology with vertical stacking of the reactors, the catalyst flows by gravity from one reactor to the next, then it is picked up by a lift line or a pneumatic transport line at the outlet of the last reactor to be introduced at the top of the regenerator in which it also flows by gravity. At the bottom of the regenerator, it is picked up by a second lift line to be introduced at the top of the first reactor.

In the technology of the applicant, the reactors are placed side by side, and the catalyst also flows by gravity inside each reactor and is transported from the bottom of a reactor to the top of the next reactor via a lift line. It is picked up by a lift line at the bottom of the last reactor to be introduced at the top of the regenerator in which it also flows by gravity. At the bottom of the regenerator, the catalyst is also picked up by a lift line to be introduced at the top of the first reactor. A detailed description of the circulation of the catalyst is indicated in Patent FR 2 657 087.

In short, in the current technology of the regenerative reforming reactors with moving beds, the catalyst circulates in succession from one reactor to the next, the same as the intermediate effluents that pass from one reactor to the next. This means that the catalyst that enters a reactor, other than the first, is a catalyst that is already coked by the reactions that have taken place in the preceding reactors. A loss in catalytic activity, penalizing the operation of each reactor and causing the following reactors to be operated at a higher temperature than the one that could be used if there were no coke deposition on the catalyst that enters the reactors, results therefrom. At the outlet of each reactor, the effluents are sent into a reheating furnace so as to enter the next reactor at a temperature level that is generally essentially identical to that of the preceding reactor, but sometimes slightly different if the operation of the unit thus requires.

The typical operating conditions of a moving-bed reforming unit are as follows: operating pressure of between 0.3 MPa and 0.8 MPa, volumetric flow rate, i.e., ratio between the catalyst mass in a reactor and mass rate of the feedstock, between 1 and 4 $h^{-1}$, molar ratio of hydrogen to hydrocarbons (H2/HC) of between 3 and 10, and more particularly between 3 and 5, mean starting temperature of the reactors of between 480 and 550° C.

This invention makes it possible to redefine the circulation of the catalyst so that the catalyst that enters all or part of the successive reactors is a catalyst that is at least partially regenerated, regardless of the technology that is used for the arrangement of the reactors. This invention can therefore be used with a technology of reactors placed side by side, or a technology of reactors that are stacked vertically on one another. In other words, the circulation of the catalyst becomes at least partially a circulation in parallel relative to the reactors, whereas that of the feedstock and effluents continues to be in series. Various embodiments of this circulation type will be presented in the text below.

SUMMARY DESCRIPTION OF THE INVENTION

Figure 1:
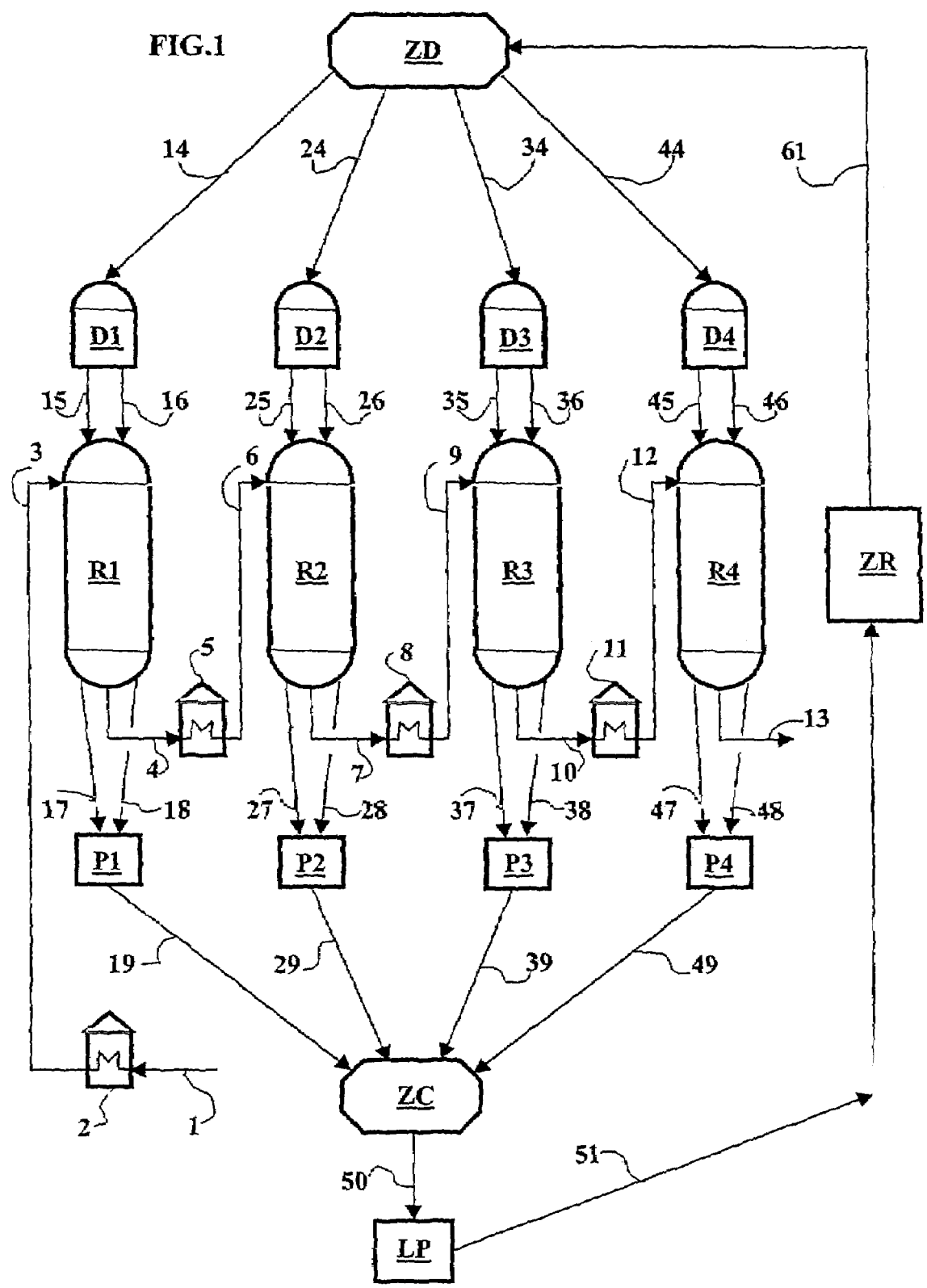
FIG. 1 shows the structure of a unit according to the invention, whereby the reactors are placed side by side.

The invention therefore consists of a new method of circulation of the catalyst in regenerative reforming units, and more generally regenerative units that use a series of moving-bed reactors, comprising at least two reactors, typically three or four reactors, through which the feedstock and the effluents pass in succession. In the text below, series of reactors (or reactor of the series) will be called the set of reactors of the unit, whether these reactors are placed side by side or stacked on one another, and as a whole, the intermediate effluents will be called the effluents that come out from the first, second and third reactors, and outlet effluent will be called the effluent that comes out from the last reactor of the series. In such a series, preferably all or part of the effluent of a reactor constitutes at least in part the feedstock of the next reactor. More preferably, the feedstock of the second reactor consists of the effluent of the first reactor, the feedstock of the third reactor consists of the effluent of the second, and so on . . . . In contrast, these terms "series of reactors" or "reactors of the series" say nothing about the method of circulation of the catalyst in the different reactors. This method of circulation can therefore be a priori in series or in parallel or both in some cases. The invention consists in supplying directly at least two of the reactors of the series by the catalyst that is obtained from the regeneration zone. The catalyst is then collected at the base of each of the reactors of the series and is introduced into a mixing zone that will make it possible to homogenize the various catalyst flows that are obtained from each of the reactors since said flows contain catalysts that do not have the same coke content.

The catalyst that is spent and homogenized is then introduced into the regeneration zone at the outlet of which is recovered a regenerated catalyst that has a coke content that is generally less than 0.5% by weight and frequently less than 0.1% by weight. The regenerated catalyst is then introduced into a distribution zone from which it is directed into at least two reactors of the series, optionally into each of the reactors.

The distribution zone will distribute the catalyst flow that is obtained from the regeneration zone into a certain number of parallel flows that supply at least two reactors, optionally each of the reactors of the series. The circulation of the catalyst inside each reactor is always carried out in a moving bed, as well as inside the regeneration zone. The zone for mixing the catalyst that is recovered at the outlet of each reactor, as well as the distribution zone of the regenerated catalyst are an integral part of the invention. The feedstock is introduced into the first reactor of the series and the intermediate effluents circulate in succession from one reactor to another. Each intermediate effluent that leaves a reactor of the series is heated by a reheating furnace that makes it possible to bring the temperature of said effluent at the inlet of the next reactor in the series to the desired level.

More specifically, the invention relates to a process for catalytic reforming of gasoline fractions or a regenerative process that uses a series of reactors, preferably four in number, forming the reaction zone, whereby the feedstock and the intermediate effluents pass through said reactors in succession and each reactor operates in a moving bed, the process having a regeneration zone that makes it possible to eliminate the coke that is deposited on the catalyst during reactions, and the process being characterized in that the regenerated catalyst that is obtained from said regeneration zone directly supplies at least two reactors of the series starting from a common distribution zone, is collected at the outlet of the reaction zone in a mixing zone where it is homogenized and, at the outlet of this mixing zone, is brought into the regeneration zone.

According to a variant of the invention, each of the reactors of the series can be supplied directly by regenerated catalyst that is obtained from the regeneration zone.

According to another variant of the invention, the regenerated catalyst can supply the first and the third reactors of the series, whereby the numbering is done in the order that feedstock and effluents pass through, the second reactor of the series being supplied by the catalyst that is obtained from the first reactor of the series, and the fourth reactor being supplied by the catalyst that is obtained from the third reactor of the series. The catalyst that is obtained from the second reactor of the series and the catalyst that is obtained from the fourth reactor of the series are, in this case, sent into a common collecting and homogenizing zone at the outlet of which the spent catalyst is directed toward the regeneration zone.

In a variant that can also be considered, the regenerated catalyst can supply the first and fourth reactors of the series, whereby the catalyst at the outlet of the first reactor is introduced at the top of the second reactor, recovered at the outlet of this second reactor to be introduced at the top of the third reactor, and at the outlet of this third reactor is directed toward the mixing zone where it rejoins the catalyst that is obtained from the fourth reactor. The catalyst that is obtained from the mixing zone is sent toward the regeneration zone.

One of the advantages of the invention is to make it possible to lower the operating pressure at the top of each of the reactors since, as it is shown in the examples below, the fact of working with a regenerated catalyst in at least two reactors of the series is accompanied by a considerable gain in activity due to a mean coke concentration that is lower in the reactors. This activity gain opens up the possibility of upgrading the operating conditions of the unit, operating pressure, H2/HC ratio or volumetric flow rate in a direction that makes it possible to very considerably increase the yield of reformate under the rigorous conditions of continuous operation or to increase the octane number of the reformate with continuous yield.

The operating pressure of the unit, regulated with a separator tank, can be established at a level that is less than 0.3 MPa absolute, preferably less than 0.2 MPa absolute and even preferably close to 0.1 MPa absolute. The H2/HC molar ratio, generally between 2 and 3 in the conventional units, can preferably be less than 2, very preferably less than 1.5, and even more preferably less than 1. Finally, the volumetric flow rate that is defined as the ratio of the catalyst mass to the mass rate of the feedstock, generally located in a range from 1.5 to 2.5 in the conventional units, can preferably be established at values that are higher than 2, preferably higher than 2.5, and even more preferably higher than 3.

This new concept also makes it possible, with the same level of rigor of operating conditions, to be able to use less catalyst, for example on the order of 20% catalyst or less compared to a conventional unit of the same capacity, and therefore to be economically more attractive both on the level of the initial investment (smaller size of the unit and less catalyst) than on the level of the operating cost that will also be reduced (lower recycling rate of hydrogen and operating conditions that are less strict overall for an improved performance level).

Finally, an extremely advantageous consequence of lowering the pressure to levels less than 0.2 MPa absolute in the separator tank is the possibility of using the instrument air (i.e., the air that is used to operate the instruments for controlling or regulating the unit) that is generally available under 0.5 to 0.7 MPa, as an oxygen carrier gas so as to carry out the combustion of the coke that is deposited on the catalyst at the level of the regeneration zone.

This invention applies to the entire series of reactors that operate in a moving bed, whether these reactors are placed side by side or else stacked vertically on one another.

DETAILED DESCRIPTION OF THE INVENTION

The detailed description of the invention will be done by means of FIG. 1 that shows a reforming unit that comprises 4 reactors, whereby each of the four reactors is supplied by catalyst that is obtained from the regeneration zone. Feedstock (1) is introduced via pipe (1), furnace (2) and line (3) into first reactor R1. The effluent of the first reactor is drawn off via line (4) and is sent through furnace (5) and line (6) into second reactor R2. The effluent of the second reactor is drawn off via pipe (7) and is sent through furnace (8) and line (9) into third reactor R3. The effluent of the third reactor is drawn off via line (10) and is sent through furnace (11) and pipe (12) into fourth reactor R4. The effluent of the fourth reactor is drawn off via pipe (13) and is directed toward a fractionation zone that is not shown in FIG. 1.

The catalyst that is obtained from distribution zone (ZD) penetrates tank (D1).

It is introduced into first reactor R1 by a number of pipes such as (15) and (16). The catalyst flows from top to bottom inside reactor R1 in the moving bed state. It is picked up at the outlet of reactor R1 by a number of struts such as (17) and (18) and is directed via line (19) toward a collecting pot ZC. This collecting pot also plays the role of mixer and for this reason will be called a mixing zone.

This zone will be of any type that is known to one skilled in the art. It is possible to cite, for example, the multimixing zones by successive division of an initial flow, or, for example, the mixers that are used for the homogenization of granular solid that is proposed by the SULZER Company and marketed under the name SMF mixer. Starting from the collecting pot or mixing zone ZC, the catalyst is continuously drawn off via line (50) and introduced into the lifting pot (lift pot according to English terminology) (LP) via line (50). It is picked up from lift pot (LP) via lift line (51) to be directed toward regeneration zone (ZR).

At the end of regeneration zone (ZR), the catalyst is brought via lift line (61) toward distribution zone (ZD).

The regulation of the catalyst flow rate is ensured by a secondary flow rate generally of hydrogen or a nitrogen-type cover gas, introduced into lift pot (LP) and not shown in FIG. 1. The gas that is used in the lift and in the transport of the catalyst is generally hydrogen or a cover gas such as nitrogen, coming from an outside unit or, in the case of hydrogen, produced by the unit itself. The path of the catalyst as described above for reactor R1 is exactly the same for the catalyst that supplies reactor R2, reactor R3 and reactor R4 starting from a common distribution zone ZD. The line numbers such as 14, 15, 16, 17, 18, and 19 therefore become 24, 25, 26, 27, 28 and 29 for the path of the catalyst that supplies the second reactor. These numbers are 34, 35, 36, 37, 38, and 39 for the path of the catalyst that supplies the third reactor, and these numbers are 44, 45, 46, 47, 48 and 49 for the path of the catalyst that supplies the fourth reactor.

All of the catalyst that is introduced into reactors R1, R2, R3 and R4 is therefore found in mixing zone ZC, which can be of any type that is known to one skilled in the art, for example alternately to the commercial type already cited, a fluidized zone that makes it possible to deliver a homogeneous catalyst toward lift pot (LP). This zone is important within the scope of this invention since the catalyst that is obtained from each of the reactors of the series is not necessarily, according to the operating conditions of the unit, the same level of deposited coke, whereby the fluctuations of coke content can go up to 5%. For the regeneration zone to work properly, it is important, however, that a catalyst flow through the latter whose coke content does not continuously vary too much. Mixing zone ZC will make it possible specifically, according to the operation of the unit, to manage significant differences in coke content.

French Patent Application FR 02/03210 develops a methodology for controlling the regeneration zone that is perfectly applicable within the scope of this invention, particularly in the mode with continuous coke flow.

The regeneration zone of the catalyst remains basically the same as in a regenerative reforming unit according to the prior art, i.e., this regeneration zone comprises 3 stages:

1) a combustion stage during which the coke that is deposited on the catalyst is eliminated by burning with a gas that contains oxygen, generally air,
2) a halogenation stage during which the catalyst is flushed by a halogenated gas, generally a halogenated hydracid or an alkyl halide so as to redisperse the metallic phase on the surface of the catalyst,
3) a stage for drying or calcination that eliminates from the catalyst the water that is produced by the combustion of the coke.

These three stages are generally completed by a reduction stage during which the catalyst is reduced prior to the introduction of the feedstock. This stage is carried out in general between the regeneration zone and the first reactor, i.e., at tank (ZD) that is located upstream from tanks D1, D2, D3 and D4 in FIG. 1. In the case of a reduction in two stages, it is possible to consider carrying out the first stage of the reduction at low temperature in tank (ZD) and the second stage of the reaction at high temperature in tanks D1, D2, D3 and D4.

A more detailed description of the regeneration zone of which it will be possible to find a standard description in Application FR 02/03210 that contains a method for regulation of the catalyst flow rate that enters into each reactor that is perfectly applicable and even preferred within the scope of this invention will not be provided here.

The catalyst at the outlet of the regeneration zone is brought by a lift system (lift according to English terminology) (61) into distribution zone ZD. This distribution zone is implemented in the form of a tank in the lower portion of which are located struts (14), (24), (34), and (44) that will lead the catalyst respectively toward tanks D1, D2, D3 and D4. These lines (14), (24), (34), and (44) that connect distributor tank ZD that is located at a higher level relative to the level of tanks D1, D2, D3 and D4 will be arranged according to the rules of the art to make possible the circulation of the catalyst by gravity.

In the same way, struts (19), (29), (39), and (49) that connect lift pots P1, P2, P3 and P4 to the collecting and mixing zone ZC that is located at a lower level are arranged according to the rules of the art to make possible the circulation of the catalyst by gravity.

Figure 2:
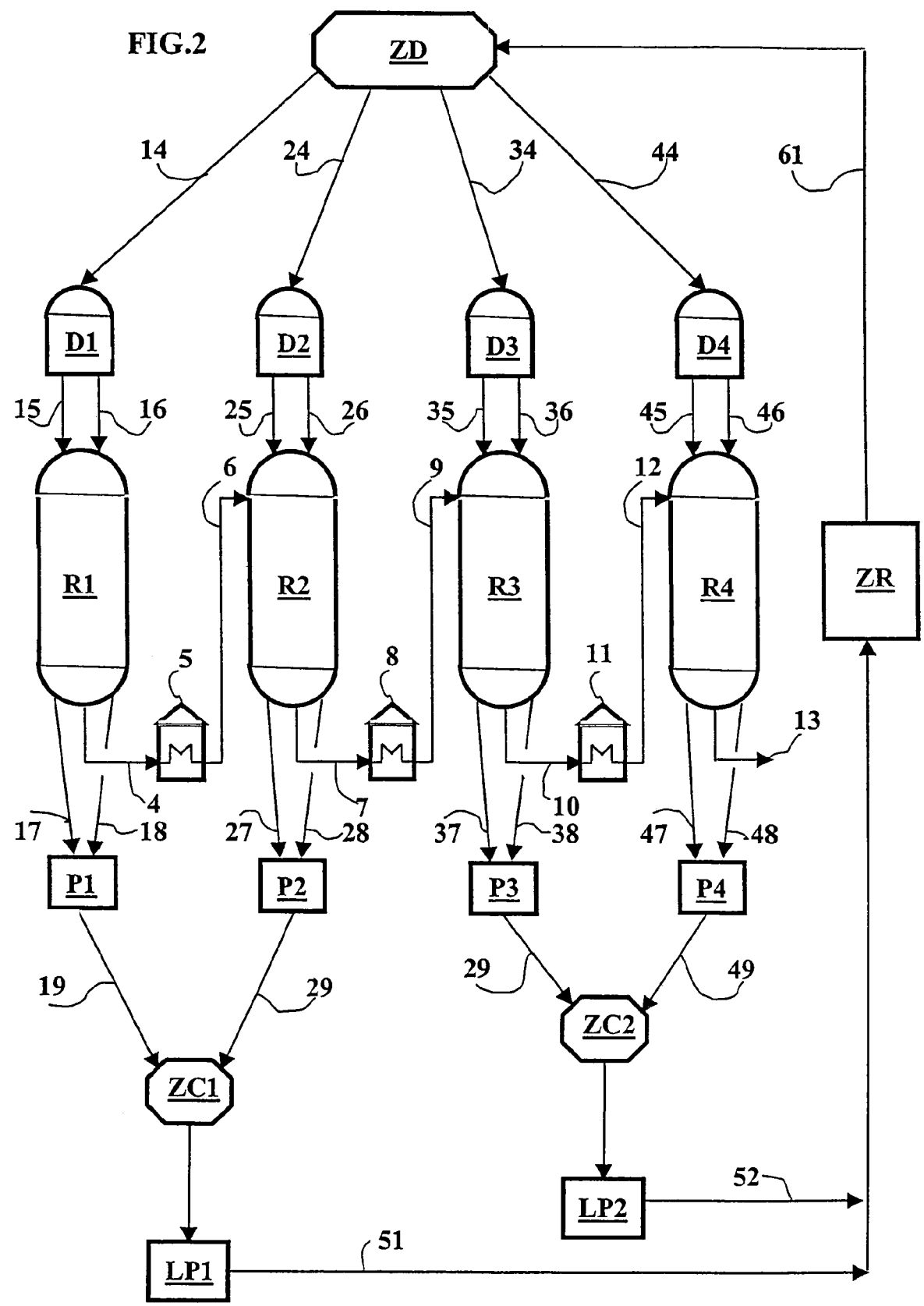
FIG. 2 shows a variant of the invention in which the collection of the catalyst at the outlets of the various reactors is done two by two.

FIG. 2 illustrates another variant of the invention in which each reactor R1, R2, R3 and R4 is supplied with regenerated catalyst, and the collecting of the spent catalyst is carried out by a group of two reactors, i.e., the catalyst that is obtained from reactors R1 and R2 is sent into a collecting and mixing zone ZC1, and the catalyst that is obtained from reactors R3 and R4 is sent into a collecting and mixing zone ZC2 that is separate from ZC1. Starting from zone ZC1, a lift pot LP1 supplies a lift line 51 that brings the catalyst that is obtained from R1 and R2 into a regeneration zone, and starting from zone ZC2, a lift pot LP2 supplies a lift line 52 that brings the catalyst that is obtained from reactors R3 and R4 toward the regeneration zone. This configuration therefore comprises two separate lift lines to bring the catalyst that is obtained from reaction zones into a regeneration zone.

The feedstock always flows in succession from R1 toward R2, R3 and R4 via lines 4, 6, 7, 9, 10, 12, 13 and furnaces 5, 8 and 11.

Figure 3:
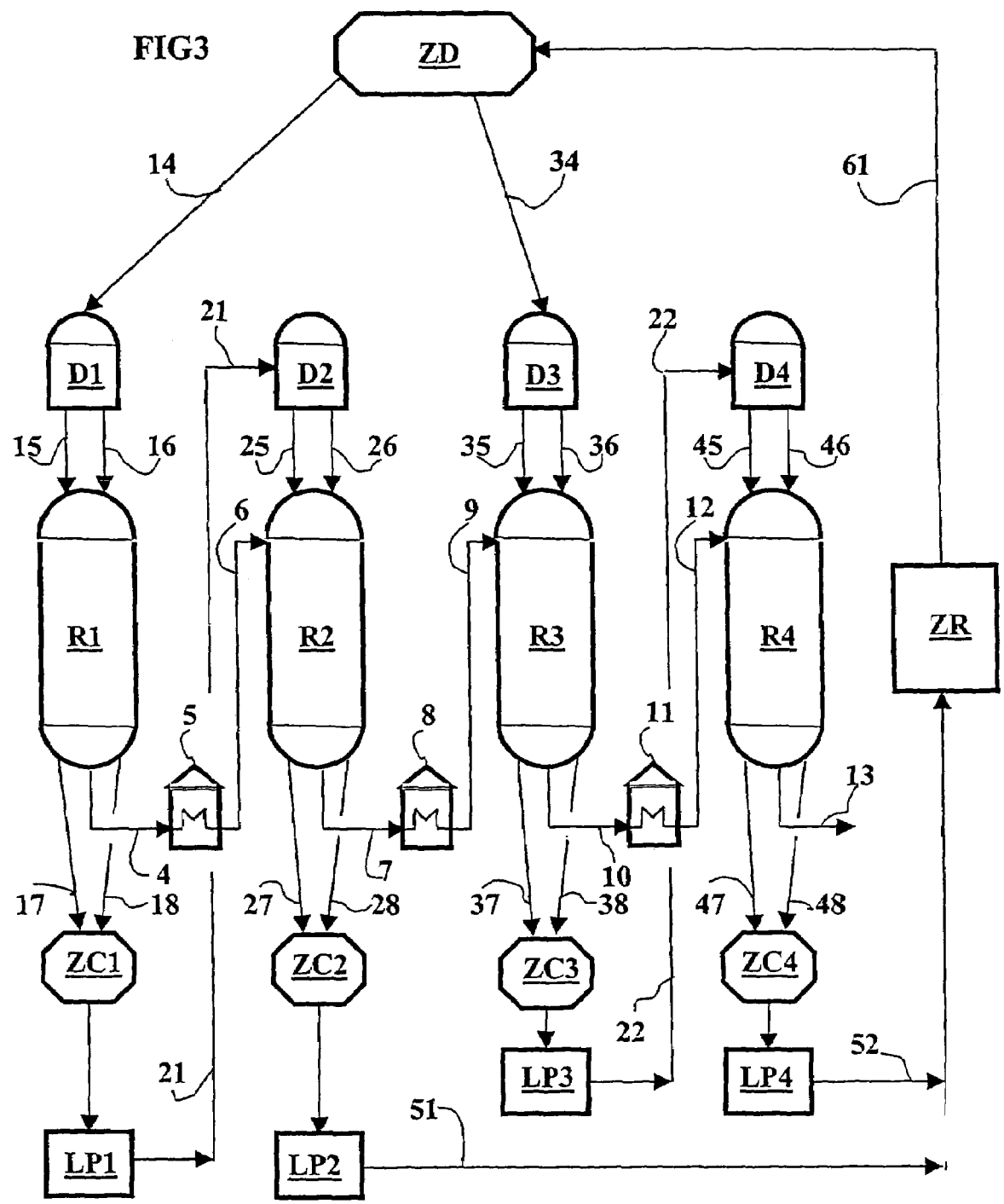
FIG. 3 shows another variant of the invention in which for some reactors, the catalyst at the outlet of these reactors is not sent into the regeneration zone, but to the top of another reactor, i.e., a configuration that can be described as a hybrid between that of the prior art and that of this invention.

FIG. 3 illustrates another variant of the invention that corresponds to a hybrid structure between that of the prior art and that of this invention. The regenerated catalyst that is obtained from distribution zone ZD supplies tank D1 and tank D3. Starting from tank D1, the catalyst flows into reactor R1, is collected at the outlet of R1 in collecting pot ZC1 and is led via lift pot LP1 and lift line (21) toward tank D2 starting from which the catalyst is introduced at the top of reactor R2. The catalyst flows into reactor R2, is collected in collecting pot ZC2 and is introduced via lift pot LP2 and lift line 51 toward the regeneration zone.

Starting from tank D3, the catalyst flows into reactor R3, is collected at the outlet of R3 in collecting pot ZC3 and is led via lift pot LP3 and lift line (22) toward tank D4 from which the catalyst is introduced at the top of reactor R4. The catalyst flows into reactor R4, is collected in collecting pot ZC4 and is introduced via lift pot LP4 and lift line 52 toward the regeneration zone.

In this configuration, the catalyst therefore flows in succession, on the one hand, from reactor R1 to reactor R2, and, on the other hand, from reactor R3 to reactor R4, but it is distributed in parallel from distribution zone ZD to reactors R1 and R3. The feedstock always flows in succession from R1 to R2, R3, and R4 via lines 4, 6, 7, 9, 10, 12, and 13 and furnaces 5, 8 and 11.

The invention therefore relates to a process for treatment of fractions of hydrocarbons, of regenerative reforming type, using a series of at least two reactors, forming the reaction zone, whereby the feedstock and the intermediate effluents pass through the reactors in succession and each reactor operates in a moving bed, and whereby said process has a regeneration zone that makes it possible to eliminate the coke that is deposited on the catalyst during reactions, and whereby said process is characterized in that the regenerated catalyst that is obtained from said regeneration zone directly supplies at least two reactors of the series from a common distribution zone, is collected at the outlet of the reaction zone in a mixing zone where it is homogenized and, at the outlet of this mixing zone, is brought into the regeneration zone.

The process according to the invention preferably comprises 4 reactors that are arranged in series.

According to a first variant of the process according to the invention, each of the reactors of the series is supplied directly by the regenerated catalyst that is obtained from the regeneration zone.

According to a second variant of the process according to the invention, the regenerated catalyst supplies the first and the third reactors of the series, whereby the numbering is done in the order in which the feedstock and intermediate effluent pass through and whereby the second reactor of the series is supplied by the catalyst that is obtained from the first reactor of the series, and whereby the fourth reactor is supplied by the catalyst that is obtained from the third reactor of the series.

According to a third variant of the process according to the invention, the regenerated catalyst supplies the first and the fourth reactors of the series, whereby the numbering is done in the order in which the feedstock and the intermediate effluents pass through, whereby the second reactor of the series is supplied by the catalyst that is obtained from the first reactor of the series, and whereby the third reactor of the series is supplied by the catalyst that is obtained from the second reactor of the series.

EXAMPLE 1

For Comparison

The first example or the starting conditions correspond to a unit according to the prior art according to Patent FR 2 657 087, comprising four reactors, working on an atmospheric distillation gasoline fraction ("straight run" naphtha according to English terminology) that exhibits paraffin/naphthene/aromatic compound (P/N/A) ratios in % by volume of 64.5/24.4/11.1.

The catalyst that is used is a standard regenerative reforming catalyst with a Pt base.

The operating conditions are as follows:
Pressure in the separator: 0.23 MPa
H2/HC molar ratio: 2
Mean temperature at the top of the reactors: 510° C.
Feedstock flow rate: 100 T/h
Amount of catalyst: 50 T
or a volumetric flow rate of $2\ h^{-1}$.

Under these conditions, the desired octane number of the reformate is 102, the reformate yield is 88.95%, and the hydrogen yield is 3.49%. The coke level at the outlet of the fourth reactor is 5.87%.

EXAMPLE 2

According to the Invention

So as to carry out comparisons on an identical basis, the research octane number of the reformate is kept at 102 in all of the following examples.

In this example, the catalyst that is obtained from the regeneration zone supplies each of the four reactors in parallel.

The operating pressure in the separator tank is kept at 0.23 MPA, and the other operating parameters are indicated in Table 1.

A reduction of the coke content of the catalyst at the outlet of each reactor is noted relative to the first example. In particular, at the outlet of the last reactor, the coke drops to 3.76% from 5.87% at the outset. Furthermore, the reformate yield is higher.

EXAMPLE 3

According to the Invention

In this example, the operating pressure in the separator tank is lowered to 0.08 MPa. The H2/HC ratio is kept at 2, and the volumetric flow rate is increased to 2.5 h$^{-1}$, or an increase in the feedstock flow rate of 25%, or expressed equivalently, a reduction in the amount of catalyst of 20%. The reformate yield passes to 90.55% (at the outset at 88.9%). It is also noted that the coke yield is raised to 5.02% from 3.76% in Example 2, but it remains less than that at the outset (5.87%).

EXAMPLE 4

According to the Invention

In this example, the operating pressure is kept at 0.08 MPa, but the H2/HC ratio is lowered to 1.3 so as to compare the fourth example with the starting conditions (Example 1) with the same level of coke. The reformate yield that passes to 91.44% (or 2.5 points more relative to the starting conditions) is again improved, and the coke yield virtually rejoins the value at the outset or 5.8%.

On the basis of a 100 T/h capacity, the gain in productivity on the reformate with a constant quality corresponds in this fourth example to a production difference of about 20,000 T/year of reformate, or a cash flow of more than about 1.2 million euros per year (baseline: 6 centimes/kg).

This new concept therefore makes it possible to obtain a better selectivity of operation with the same level of rigor of operating conditions (temperature and octane number) and this with a smaller amount of catalyst.

EXAMPLES 5 and 6

For Comparison

These examples are shown in the columns of Table 1 by cases "base 1" and "base 2" in which the operating pressure of a conventional unit that is identical to that of Example 1 is reduced to 0.08 MPa by maintaining the H2/HC ratio at 2 (base 1), then in reducing this ratio to 1.6 (base 2). The coke levels at the outlet of the last reactor are respectively 10.06% and 13.6% by weight, i.e., much too high to be accepted by a conventional regeneration zone.

This example shows that more rigorous operating conditions would be impossible to apply to a conventional unit, regardless of its technology, reactors side by side or stacked, because the coke level at the end of the reaction zone would be on the order of 10% to 15% as appropriate, which in the regeneration zone would lead to the fatal case of excessive temperatures even in the catalyst grain that are able to rapidly damage the catalyst.

One of the additional advantages of this invention is to preserve a technology of the regeneration zone that is identical to that of conventional units.

Table 1 below summarizes the results that are obtained in the various cases that are described above:

Base: Conventional unit with standard operating conditions

Base 1: Conventional unit with a reduced operating pressure

Base 2: Conventional unit with a reduced operating pressure and a reduced H2/HC ratio Case 1: Unit according to the invention with standard operating conditions Case 2: Unit according to the invention with a reduced operating pressure Case 3: Unit according to the invention with a reduced operating pressure and a reduced H2/HC ratio "PPH" corresponds to the volumetric flow rate that is defined as the ratio of the mass rate of the feedstock to the catalyst mass.

"WAIT" corresponds to the arithmetic mean of the starting temperatures of all of the reactors of the series.

"Catalyst" corresponds to the amount of catalyst that is present in the unit (also called inventory) on an arbitrary scale of 100 to assess the reduction of this inventory based on operating conditions.

"RON" is the research octane number (research octane number according to English terminology).

"H2/HC" is the ratio between the number of hydrogen moles introduced and the number of hydrocarbon moles in the feedstock.

TABLE 1

Comparison of the Various Cases

| | Ex 1 (Base) | Ex 5 (Base 1) | Ex 6 (Base 2) | Ex 2 (Case 1) | Ex 3 (Case 2) | Ex 4 (Case 3) |
|---|---|---|---|---|---|---|
| Separator pressure (MPa) | 0.23 | 0.08 | 0.08 | 0.23 | 0.08 | 0.08 |
| PPH (h − 1) | 2 | 2.5 | 2.4 | 2 | 2.5 | 2.4 |
| H2/HC | 2 | 2 | 1.6 | 2 | 2 | 1.3 |
| RON | 102 | 102 | 102 | 102 | 102 | 102 |
| WAIT (° C.) | 510.5 | 51.3 | 52.6 | 50.4 | 51.5 | 51.6 |
| Outlet Coke RX1 (% by Weight) | 2.22 | 3.21 | 4.40 | 2.10 | 2.65 | 4.00 |
| Outlet Coke RX2 (% by Weight) | 2.59 | 3.90 | 5.14 | 1.84 | 2.20 | 2.43 |
| Outlet Coke RX3 (% by Weight) | 3.55 | 5.70 | 7.30 | 2.39 | 3.10 | 3.43 |
| Outlet Coke RX4 (% by Weight) | 5.87 | 10.06 | 13.10 | 3.76 | 5.02 | 5.80 |
| C5+ (Reformate) (% by Weight) | 88.95 | 90.0 | 90.17 | 89.08 | 90.55 | 91.44 |
| H2 (% by Weight) | 3.49 | 3.62 | 3.61 | 3.51 | 3.68 | 3.75 |
| Catalyst (Scale of 100) | 100 | 80 | 83 | 100 | 80 | 83 |

The invention claimed is:

1. In a regenerative reforming process for treatment of hydrocarbon fractions comprising a series of at least two reactors forming a reaction zone, wherein feedstock and intermediate effluents pass through the reactors in succession and each reactor operates as a moving bed, the process having a regeneration zone for eliminating coke deposited on the catalyst during reactions, the improvement comprising passing coked catalysts of the same chemical type but having different amounts of coke from the outlet of said at least two reactors to a common mixing zone and homogenizing said coked catalysts so as to provide a mean coke concentration, and passing the resultant homogenized catalysts to said regeneration zone, and passing the resultant regenerated catalysts obtained from said regeneration zone directly to a common distribution zone and distributing the regenerated catalysts from said common distribution zone to said at least two reactors, and further comprising a source of air for operating instruments and employing a portion of the instrument air, for the combustion of the coke deposited on the catalyst in the regeneration zone.

2. A process according to claim 1, comprising 4 reactors arranged in series.

3. A process according to claim 2, wherein each of the reactors of the series is supplied directly by the regenerated catalyst obtained from the regeneration zone.

4. A process according to claim 2, wherein the regenerated catalyst from said common distribution zone directly supplies only the first and the third reactors of the series, whereby the numbering is done in the order that the feedstock and intermediate effluents pass through, whereby the second reactor of the series is supplied by the catalyst obtained from the first reactor of the series, and whereby the fourth reactor is supplied by the catalyst obtained from the third reactor of the series.

5. A process according to claim 2, wherein the regenerated catalyst directly supplies only the first and the fourth reactors of the series, whereby the numbering is done in the order that the feedstock and intermediate effluents pass through, whereby the second reactor of the series is supplied by the catalyst obtained from the first reactor of the series, and whereby the third reactor of the series is supplied by the catalyst obtained from the second reactor of the series.

6. A process according to claim 2, wherein the regenerated catalyst supplies each of the four reactors, and the spent catalyst is collected from only a group of two reactors.

7. A process according to claim 1, wherein the operating pressure is less than 0.2 MPa absolute.

8. A process according to claim 1, wherein the H2/HC molar ratio is less than 2.

9. A process according to claim 1, wherein the volumetric flow rate is greater than $2 \ h^{-1}$.

10. A process according to claim 1, wherein the reactors that form the series of reactors are placed side by side.

11. A process according to claim 1, wherein the reactors that form the series of reactors are stacked vertically on one another.

12. A process according to claim 1, comprising aromatization or dehydrogenation of normal paraffins.

13. A process according to claim 1, wherein said homogenizing of the coke containing catalysts is conducted by passing said catalysts to a fluidized zone.

14. A process according to claim 1, wherein said homogenizing of the coke containing catalysts is conducted by passing said catalyst to multi-mixing zone.

15. A process according to claim 1, wherein the regenerated catalyst is subjected to reduction in the common distribution zone.

16. A process according to claim 1, wherein the catalyst in the distribution zone is homogeneous.

17. A process according to claim 1, wherein the catalyst in the distribution zone is not subjected to a separation step so as to provide different types of catalysts.

18. A process according to claim 1, wherein the catalyst is passed from the distribution zone directly to said at least two reactors, optionally reduced in an intermediate reduction step.

19. A process according to claim 15, further comprising subjecting the catalyst to a further reduction step prior to being introduced into the reactors.

* * * * *